(12) United States Patent
Chen et al.

(10) Patent No.: US 11,539,928 B2
(45) Date of Patent: Dec. 27, 2022

(54) LIGHT SOURCE MODULE AND PROJECTION DEVICE

(71) Applicant: Coretronic Corporation, Hsin-Chu (TW)

(72) Inventors: Chang-Hsuan Chen, Hsin-Chu (TW); Yen-Mo Yu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/855,802

(22) Filed: Jul. 1, 2022

(65) Prior Publication Data

US 2022/0337795 A1 Oct. 20, 2022

Related U.S. Application Data

(63) Continuation of application No. 17/165,856, filed on Feb. 2, 2021, now Pat. No. 11,503,258.

(30) Foreign Application Priority Data

Feb. 5, 2020 (CN) .......................... 202010080311.9

(51) Int. Cl.
*H04N 9/31* (2006.01)
*G03B 21/20* (2006.01)

(52) U.S. Cl.
CPC ....... *H04N 9/3161* (2013.01); *G03B 21/2013* (2013.01); *G03B 21/2033* (2013.01); *H04N 9/317* (2013.01); *H04N 9/3164* (2013.01)

(58) Field of Classification Search
CPC .... H04N 9/3161; H04N 9/3164; H04N 9/317; G03B 21/2013; G03B 21/2033
USPC ............................................................ 353/94
See application file for complete search history.

(56) References Cited

U.S. PATENT DOCUMENTS

2016/0116832 A1\* 4/2016 Wang .................... F21V 9/14
353/20

\* cited by examiner

*Primary Examiner* — Jerry L Brooks
(74) *Attorney, Agent, or Firm* — JCIPRNET

(57) ABSTRACT

A light source module and a projection device are provided. The light source module is configured to provide a laser beam and includes multiple laser source units and a focusing lens. The laser source units include a first laser source unit, a second laser source unit, a third laser source unit and a fourth laser source unit respectively configured to provide a first laser beam, a second laser beam, a third laser beam and a fourth laser beam. The focusing lens is located on transmission paths of the first laser beam, the second laser beam, the third laser beam and the fourth laser beam. The first laser beam, the second laser beam, the third leaser beam and the fourth laser beam are respectively incident on the focusing lens along a first direction. The first laser source unit and the second laser source unit are arranged along a second direction.

22 Claims, 9 Drawing Sheets

LIGHT SOURCE MODULE AND PROJECTION DEVICE

CROSS-REFERENCE TO RELATED APPLICATIONS

This application is a continuation application of U.S. application Ser. No. 17/165,856, filed on Feb. 2, 2021, which claims the priority benefit of China application no. 202010080311.9, filed on Feb. 5, 2020. The entirety of the above-mentioned patent applications is hereby incorporated by reference herein and made a part of this specification.

BACKGROUND

Technical Field

The disclosure relates to an optical module and an optical device including the optical module, and more particularly to a light source module and a projection device.

Description of Related Art

Recently, projection devices based on solid-state light sources such as light-emitting diodes (LEDs) and laser diodes have gradually gained a place in the market. Generally speaking, the excitation light of solid-state light sources will be converted by the wavelength conversion material on the wavelength conversion module in the projection device to generate different colors of converted light. In addition, in order to meet the requirements of color performance, a filter module is placed on the rear light path of the projection device. The converted light on the wavelength conversion module is filtered by the filter module to filter out predetermined color lights. The color lights project the image beam to the outside via the modulation of the light valve.

Specifically, in recent years, light-emitting units of a multi-color laser (MCL) have been applied to the mainstream models of projection devices (for example, models with a luminous flux of about 2,000 lumens to 5000 lumens). Generally speaking, when the light-emitting units of the MCL are applied to the aforementioned models of the projection devices, the target brightness can be achieved with the number of light-emitting units thereof being about 1 to 2.

However, when being applied to models of projection devices having high brightness requirements, the number of light-emitting units of the MCL needs to be increased accordingly. In this way, the space requirements of the combined light path designs in the projection devices are increased accordingly and the space design requirements for configuring circuit connections, mechanism fixings, connections of heat dissipation pipes, etc. of the MCL also need to be changed accordingly, so as to take into account the overall optical, electrical, and heat conductivity efficacy. In this way, it will not be easy to reduce the size of the overall device and the design difficulty of relevant light path designs and mechanism configurations will also be increased.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a light source module having a small volume and a simple light path design.

The disclosure provides a projection device having a small volume and a simple light path design.

Other objectives and advantages of the disclosure can be further understood from the technical features disclosed by the disclosure.

In order to achieve one, a part, or all of the foregoing objectives or other objectives, an embodiment of the disclosure provides a light source module. The light source module is configured to provide a laser beam and includes multiple laser source units, a first light combining unit, a second light combining unit and a focusing lens. The multiple laser source units include a first laser source unit, a second laser source unit, a third laser source and a fourth laser source respectively configured to provide a first laser beam, a second laser beam, a third laser beam and a fourth laser beam. The first light combining unit has a first reflection region and a first transmission region. The second light combining unit has a second reflection region and a second transmission region. The focusing lens is located on transmission paths of the first laser beam, the second laser beam, the third laser beam and the fourth laser beam. The first laser beam, the second laser beam, the third laser beam and the fourth laser beam are respectively incident on the focusing lens along a first direction. The first laser source unit and the second laser source unit are arranged along a second direction. When viewed along a third direction, the first laser source unit and the second laser source unit do not overlap. When viewed along the second direction, the first laser source unit and the second laser source unit are displaced up and down, and the first laser source unit and the second laser source unit are partially overlapped. The third laser beam is reflected by the second reflection region of the second light combining unit, and the fourth laser beam is reflected by the first reflection region of the first light combining unit. The first direction, the second direction, and the third direction are perpendicular to one another.

In order to achieve one, a part, or all of the foregoing objectives or other objectives, an embodiment of the disclosure provides a projection device. The projection device includes an illumination system, a light valve, and a projection lens. The illumination system is suitable for providing an illumination beam and includes the light source module. The light valve is disposed on a transmission path of the illumination beam and is suitable for converting the illumination beam into an image beam. The projection lens is disposed on a transmission path of the image beam and is suitable for projecting the image beam out of the projection device.

Based on the above, the embodiments of the disclosure have at least one of the following advantages or effects. In the embodiments of the disclosure, by configuring the first laser source unit and the second laser source unit with a displaced arrangement, the projection device and the light source module enable the first laser source unit and the second laser source unit to be disposed on the same plane and to have heat dissipation modules independent from each other and heat pipes thereof, so as to realize miniaturization of the projection device and the light source module and to have a simple light path design. In addition, by disposing a first light combining unit and a second light combining unit, the projection device and the light source module enable the first laser beam, the second laser beam, the third laser beam, and the fourth laser beam to be uniformly incident on each region of a light incident surface of the focusing lens, so as to improve the light receiving efficiency, such that the illumination beam can have a good color performance.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
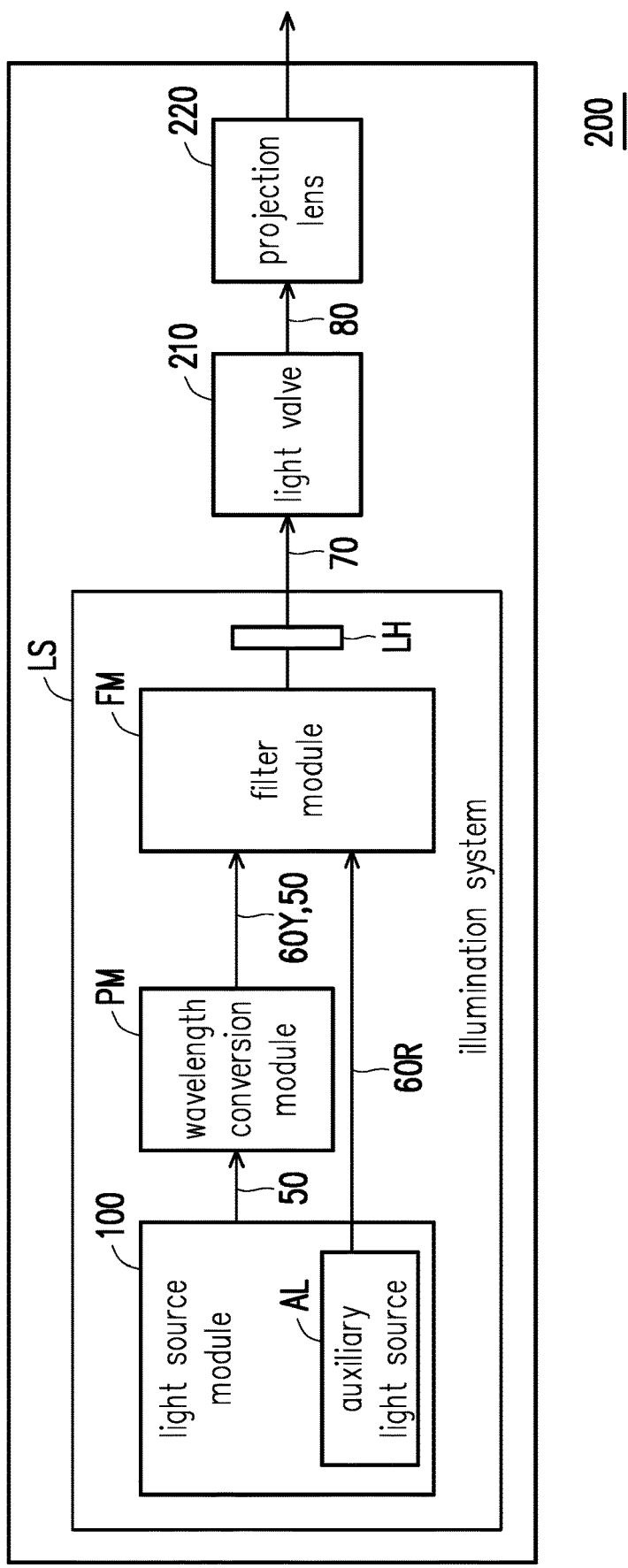
FIG. 1 is a schematic view of a structure of a projection device according to an embodiment of the disclosure.

FIG. 1 is a schematic view of a structure of a projection device according to an embodiment of the disclosure. Please refer to FIG. 1. A projection device 200 includes an illumination system LS, a light valve 210, and a projection lens 220. The illumination system LS is suitable for providing an illumination beam 70. The light valve 210 is disposed on a transmission path of the illumination beam 70 and is suitable for converting the illumination beam 70 into an image beam 80. The projection lens 220 is disposed on a transmission path of the image beam 80 and is suitable for projecting the image beam 80 out of the projection device 200. In the embodiment, the number of the light valve 210 is one, but the disclosure is not limited thereto. In other embodiments, the number of the light valve 210 may also be multiple. In addition, in the embodiment, the light valve 210 may be a digital micro-mirror device (DMD) or a liquid crystal-on-silicon panel (LCOS panel). However, in other embodiments, the light valve 210 may also be a transmissive liquid crystal panel or other beam modulators.

Specifically, as shown in FIG. 1, in the embodiment, the illumination system LS includes a light source module 100, a wavelength conversion module PM, and a filter module FM. The structure of the light source module 100 will be further described below with reference to FIG. 2A to FIG. 3D.

Figure 2A:
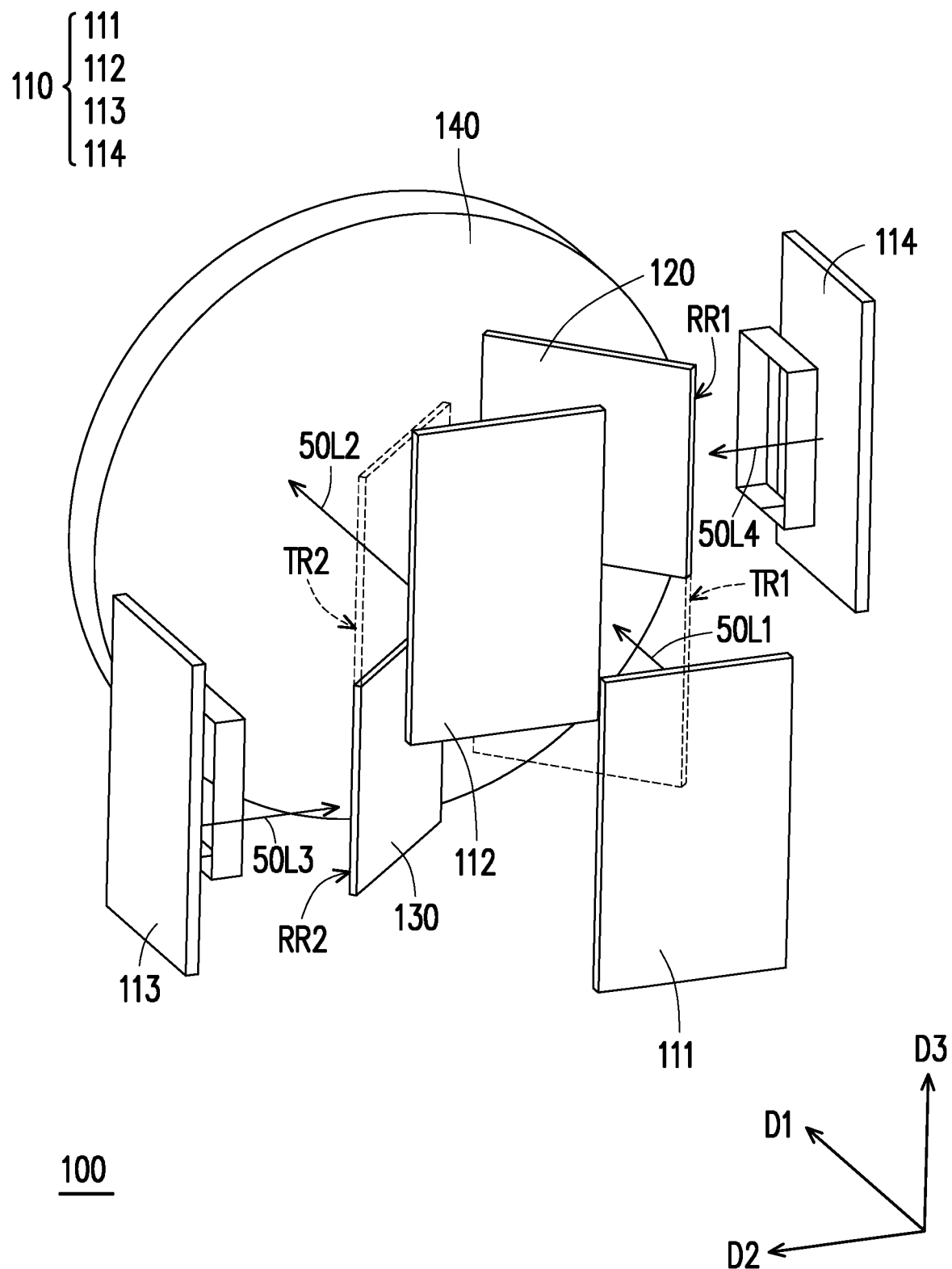
FIG. 2A is a perspective view of a structure of a light source module of FIG. 1.
Figure 2B:
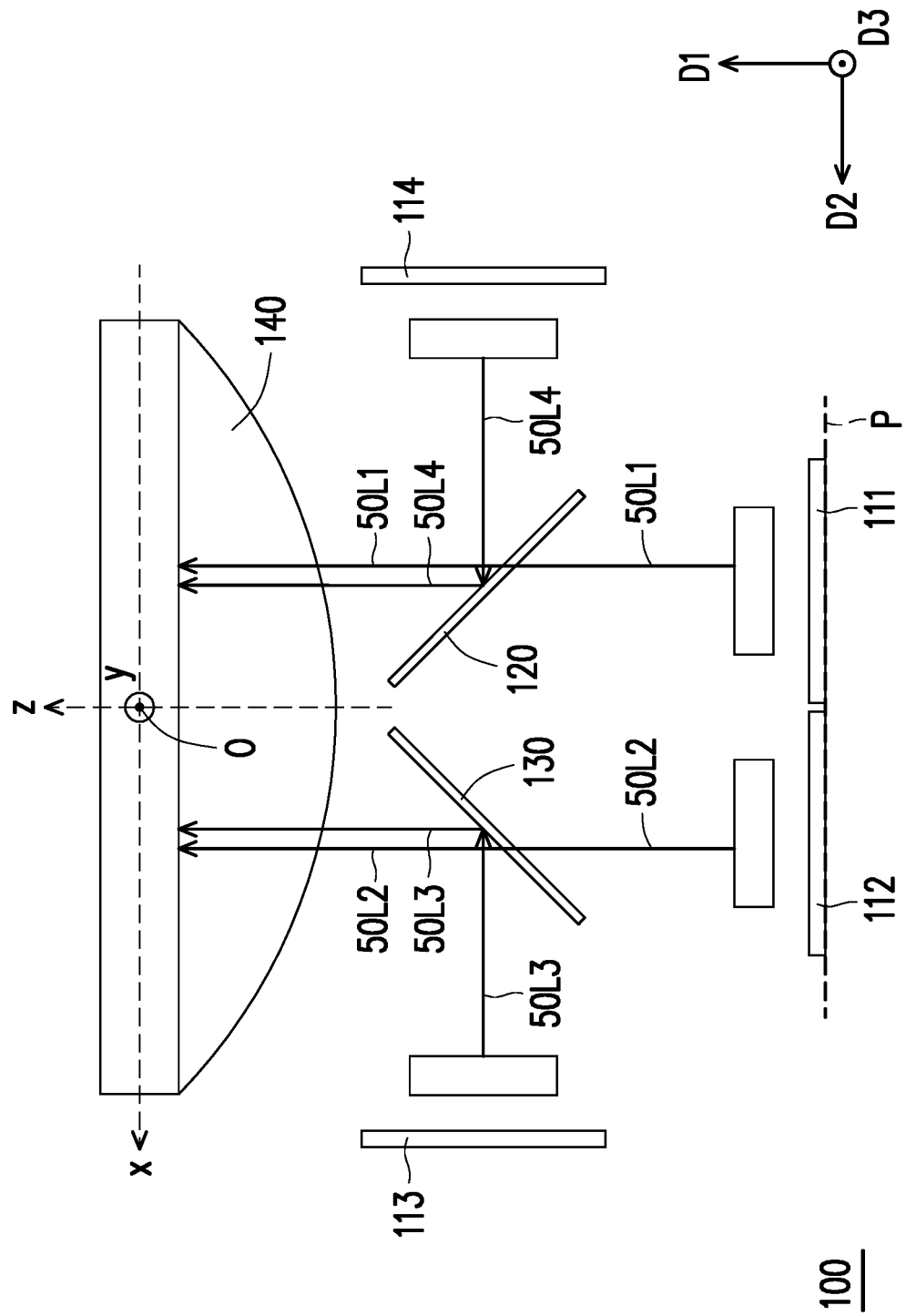
FIG. 2B is a top view of the light source module of FIG. 1.
Figure 2C:
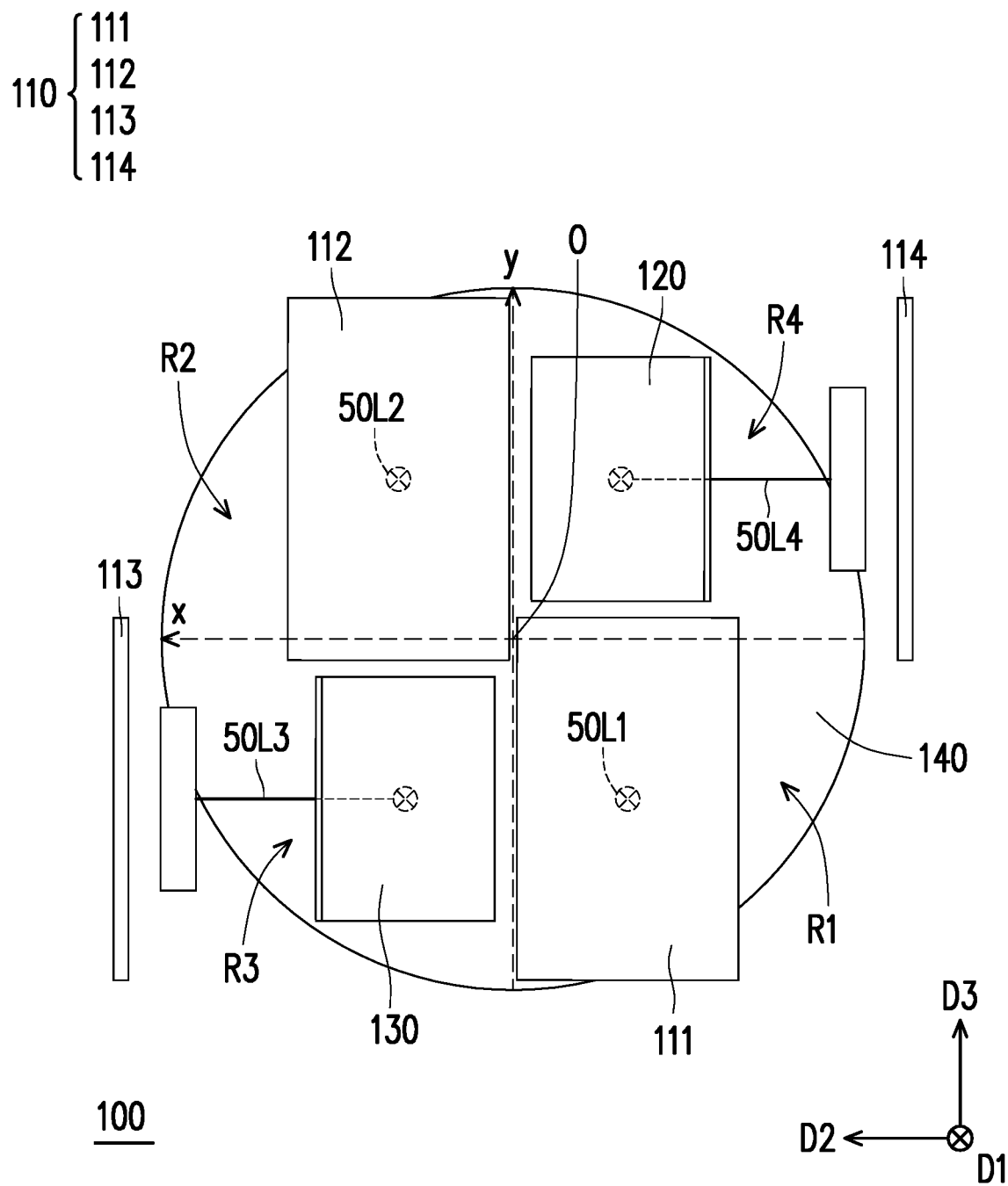
FIG. 2C is a front view of the light source module of FIG. 1.
Figure 3A:
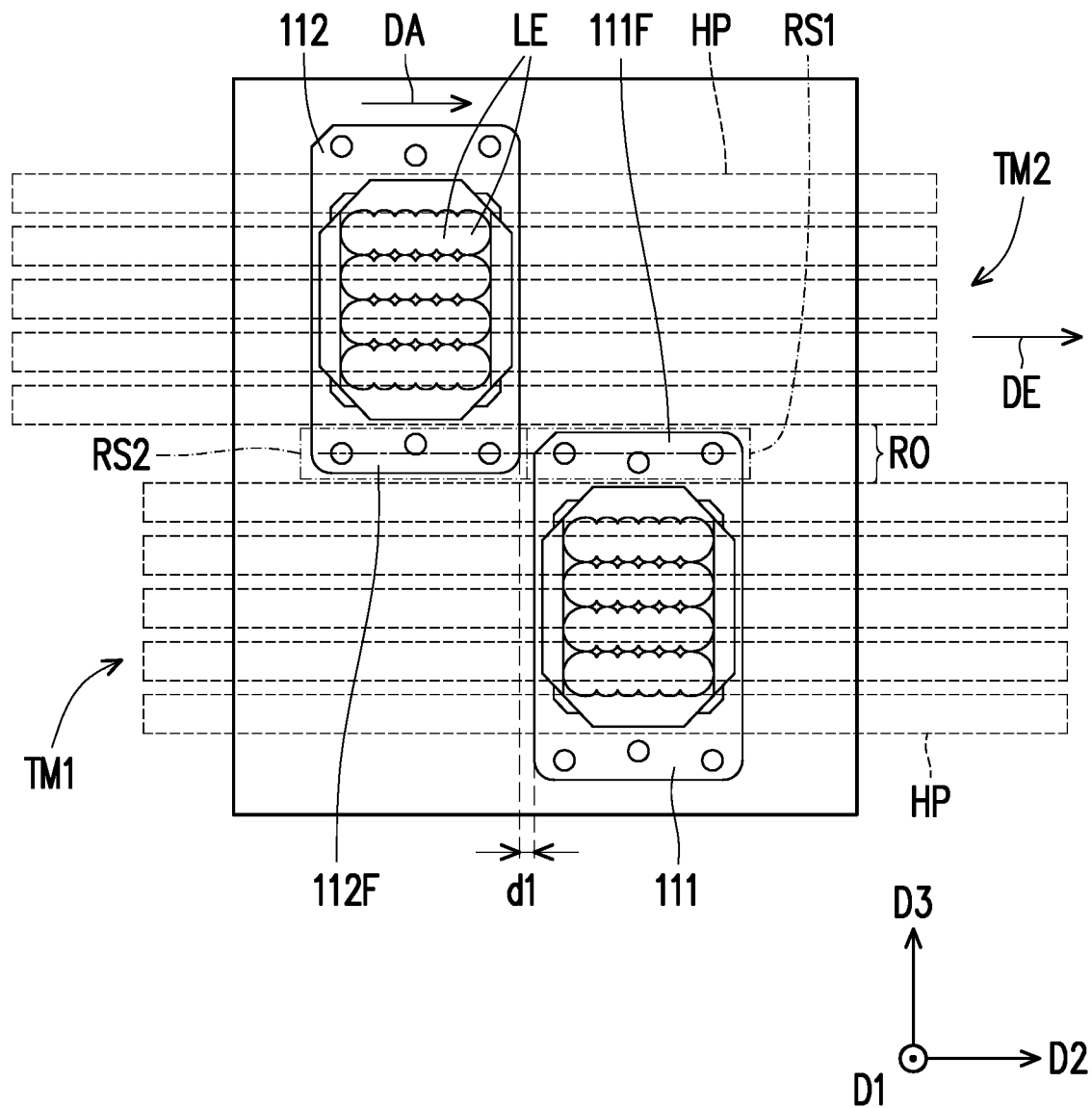
FIG. 3A and FIG. 3C are schematic views of different structures of a first laser source unit and a second laser source unit of FIG. 2A.
Figure 3B:
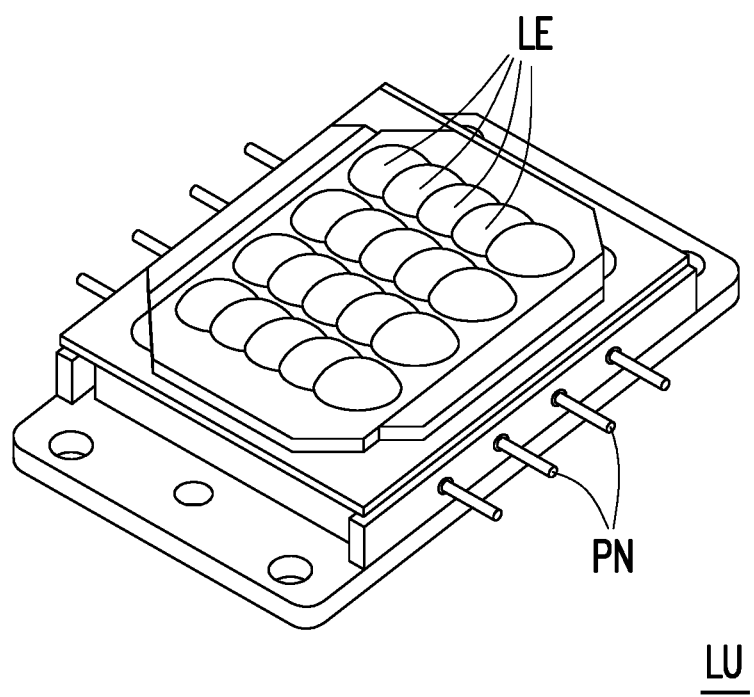
FIG. 3B is a perspective view of each laser source unit of FIG. 2A.
Figure 3C:
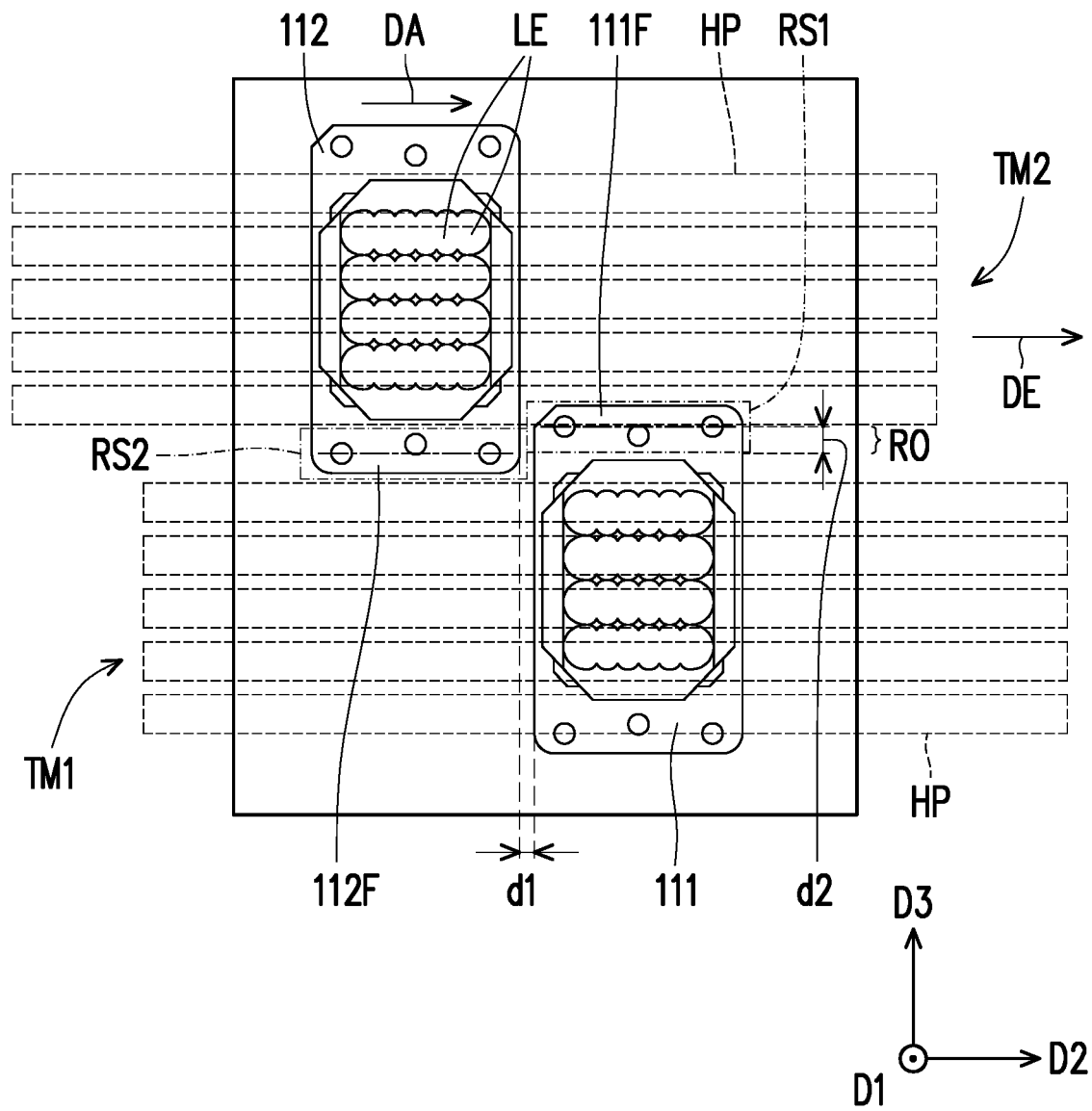
Figure 3D:
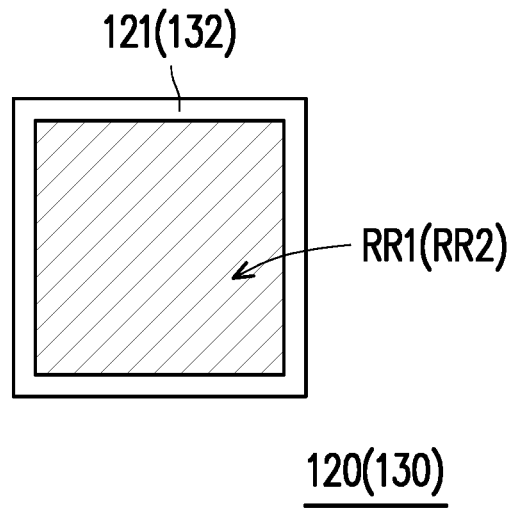
FIG. 3D is a schematic view of a structure of a first light combining unit or a second light combining unit of FIG. 2A.

Please refer to FIG. 2A to FIG. 3D. FIG. 2A is a perspective view of a structure of a light source module of FIG. 1. FIG. 2B is a top view of the light source module of FIG. 1. FIG. 2C is a front view of the light source module of FIG. 1. FIG. 3A and FIG. 3C are schematic views of different structures of a first laser source unit and a second laser source unit of FIG. 2A. FIG. 3B is a perspective view of each laser source unit of FIG. 2A. FIG. 3D is a schematic view of a structure of a first light combining unit or a second light combining unit of FIG. 2A. Specifically, as shown in FIG. 2A to FIG. 2C, in the embodiment, the light source module 100 is configured to provide a laser beam 50 (shown in FIG. 1) and includes multiple laser source units 110, a first light combining unit 120, a second light combining unit 130, and a focusing lens 140.

More specifically, as shown in FIG. 2A to FIG. 2C, in the embodiment, the multiple laser source units 110 include a first laser source unit 111, a second laser source unit 112, a third laser source unit 113, and a fourth laser source unit 114 (hereinafter, a laser source unit LU is used when describing the common characteristics of the first laser source unit 111, the second laser source unit 112, the third laser source unit 113, and the fourth laser source unit 114). For example, in the embodiment, the laser source unit LU may be a multi-color laser (MCL).

Please refer to FIG. 3A to FIG. 3C. In the embodiment, the laser source unit LU may include multiple light-emitting elements LE arranged along an arrangement direction DA, wherein the light-emitting elements LE on the same column are connected in series with one another. Taking FIG. 3B as an example, there are five light-emitting elements LE on the same column, but the disclosure is not limited thereto. In addition, as shown in FIG. 3B, there are multiple pins PN next to the laser source unit LU to receive signals uploaded from a circuit board.

Moreover, as shown in FIG. 2B, in the embodiment, the first laser source unit 111, the second laser source unit 112, the third laser source unit 113, and the fourth laser source unit 114 are respectively configured to provide a first laser beam 50L1, a second laser beam 50L2, a third laser beam 50L3, and a fourth laser beam 50L4. In the embodiment, the light-emitting elements LE included in the first laser source unit 111, the second laser source unit 112, the third laser source unit 113, and the fourth laser source unit 114 may be the same or different laser diodes, and the first laser beam 50L1, the second laser beam 50L2, the third laser beam 50L3, and the fourth laser beam 50L4 may be monochromatic blue laser beams, but the embodiment is not limited thereto. In other embodiments, the first laser beam 50L1, the second laser beam 50L2, the third laser beam 50L3, and the fourth laser beam 50L4 may also be laser beams including multiple colors to increase brightness while providing a rich color performance, so as to improve quality of image picture.

More specifically, as shown in FIG. 2A to FIG. 2C, in the embodiment, the first laser source unit 111 and the second laser source unit 112 face the focusing lens 140, the first laser beam 50L1 and the second laser beam 50L2 are respectively incident on the focusing lens 140 along a first direction D1, the first laser source unit 111 and the second laser source unit 112 are arranged along a second direction D2, and when viewed along a third direction D3, the first laser source unit 111 and the second laser source unit 112 do not overlap. In other words, the projection of the first laser source unit 111 in the third direction D3 and the projection of the second laser source unit 112 in the third direction D3 do not overlap. Moreover, as shown in FIG. 3A, the first laser source unit 111 includes a first side region RS1, the second laser source unit 112 includes a second side region RS2, and when viewed along the second direction D2, the first side region RS1 overlaps with the second side region RS2. In other words, the projection of the first side region RS1 in the second direction D2 overlaps with the projection of the second side region RS2 in the second direction D2.

In more detail, in order to facilitate descriptions of the direction of each element or structure in the light source module 100, as shown in FIG. 2B to FIG. 2C, a rectangular coordinate system is defined as follows, wherein the rectangular coordinate system uses the center of the focusing lens 140 as an origin O, the x-axis thereof is substantially parallel to the second direction D2, the y-axis is substantially parallel to the third direction D3, and the z-axis is substantially parallel to the first direction D1. In other words, in the embodiment, the first direction D1, the second direction D2, and the third direction D3 are perpendicular to one another. However, the rectangular coordinate system is only coordinates with reference to the accompanying drawings. Therefore, the coordinate terminologies used are only for descriptive purposes and not to limit the disclosure.

As such, as shown in FIG. 3A, in the embodiment, the first laser source unit 111 and the second laser source unit 112 may be closely arranged as displaced up and down in the second direction D2 or arranged as displaced up and down within a tolerance range. For example, in the embodiment, a range of a shortest distance d1 between the first laser source unit 111 and the second laser source unit 112 in the second direction D2 is less than or equal to 2 mm. In this way, the volume of the system can be reduced while avoiding the tolerance in terms of assembly.

On the other hand, as shown in FIG. 2A to FIG. 2C and FIG. 3A, the first laser source unit 111 and the second laser source unit 112 are located on the same side of a same plane P. The first direction D1 is perpendicular to the plane P, and the second direction D2 and the third direction D3 are parallel to the plane P. In this way, the configuration of a heat dissipation module TM1 and a heat dissipation module TM2 may be facilitated. For example, in the embodiment, the first laser source unit 111 and the second laser source unit 112 are disposed on the same substrate or on the surface of other elements (such as the heat dissipation module TM1 and the heat dissipation module TM2). In this way, the disposition of the heat dissipation module TM1 and the heat dissipation module TM2 may be easily performed.

Further, in the embodiment, the heat dissipation module TM1 and the heat dissipation module TM2 may be respectively connected to the first laser source unit 111 and the second laser source unit 112 to be respectively disposed behind the first laser source unit 111 and the second laser source unit 112. Furthermore, as shown in FIG. 3A, the heat dissipation module TM1 and the heat dissipation module TM2 respectively have multiple heat pipes HP, and the heat pipes HP extend along an extending direction DE. In the embodiment, the arrangement direction DA of the light-emitting elements LE may be parallel to the extending direction DE of the heat pipes HP, but the embodiment is not limited thereto.

Furthermore, as shown in FIG. 3A, the first laser source unit 111 includes a first fixing portion 111F and the second laser source unit 112 includes a second fixing portion 112F. More specifically, the first laser source unit 111 and the second laser source unit 112 are respectively fixed on the heat dissipation module TM1 and the heat dissipation module TM2 by the configuration of the first fixing portion 111F and the second fixing portion 112F. For example, the first fixing portion 111F and the second fixing portion 112F may be screws to respectively lock the first laser source unit 111 and the second laser source unit 112 onto the heat dissipation module TM1 and the heat dissipation module TM2.

Moreover, as shown in FIG. 3A, in the embodiment, the configuration regions of the heat pipes HP of the heat dissipation module TM1 and the heat pipes HP of the heat dissipation module TM2 need to avoid the first fixing portion 111F and the second fixing portion 112F to avoid affecting the configuration of the mechanism. More specifically, the heat pipes HP of the heat dissipation module TM1 are located below the first fixing portion 111F and the heat pipes HP of the heat dissipation module TM2 are located above the second fixing portion 112F. In other words, in the embodiment, the first laser source unit 111 and the second laser source unit 112 have the heat dissipation module TM1 and the heat dissipation module TM2 independent from each other and the heat pipes HP thereof. In this way, compared to the conventional case where two laser source units are side by side and share the heat pipes of the same heat dissipation module, the first laser source unit 111 and the second laser source unit 112 may respectively radiate heat to different sides by the heat dissipation module TM1 and the heat dissipation module TM2 independent from each other, so as to improve the effect of heat dissipation.

On the other hand, as shown in FIG. 3A, the first fixing portion 111F is located in the first side region RS1 and the second fixing portion 112F is located in the second side region RS2. In other words, the projections of the first fixing portion 111F and the second fixing portion 112F in the second direction D2 are located on an overlap region RO shown in FIG. 3A. In this way, when viewed along the second direction D2, since the first fixing portion 111F substantially overlaps with the second fixing portion 112F in the second direction D2, the system volume can be further reduced. For example, as shown in FIG. 3A, the center line of the first fixing portion 111F and the center line of the second fixing portion 112F are preferably aligned in the second direction D2, that is, the shortest distance between the projection of the center line of the first fixing portion 111F in the second direction D2 and the projection of the center line of the second fixing portion 112F in the second direction D2 is 0. In this way, the configuration area of the heat pipes HP is maximized to simultaneously take into account the efficacy of heat dissipation while reducing the system volume, but the disclosure is not limited thereto. For example, as shown in FIG. 3C, the first fixing portion 111F and the second fixing portion 112F may be slightly displaced to achieve a similar heat dissipation effect. In detail, as shown in FIG. 3C, a range of a shortest distance d2 between the center line of the first fixing portion 111F and the center line of the second fixing portion 112F in the third direction D3 is less than or equal to 8 mm. In this way, the system volume can be further reduced.

Next, as shown in FIG. 2B to FIG. 2C, the third laser source unit 113 faces one side of the second direction D2 and the fourth laser source unit 114 faces another side of the second direction D2. In more detail, the third laser source unit 113 faces the direction of the negative x-axis and the fourth laser source unit 114 faces the direction of the positive x-axis, but the disclosure is not limited thereto. In other embodiments, the configuration directions of the third laser source unit 113 and the fourth laser source unit 114 may also be reversed.

In addition, as shown in FIG. 2A to FIG. 2C, the first light combining unit 120 is disposed corresponding to the first laser source unit 111 and the fourth laser source unit 114, wherein the first light combining unit 120 has a first transmission region TR1 and a first reflection region RR1. The second light combining unit 130 is disposed corresponding to the second laser source unit 112 and the third laser source unit 113, wherein the second light combining unit 130 has a second transmission region TR2 and a second reflection region RR2. For example, in the embodiment, the first reflection region RR1 of the first light combining unit 120 and the second reflection region RR2 of the second light combining unit 130 are comprised of a reflective substrate or a substrate coated with a highly reflective coating. On the other hand, the first transmission region TR1 of the first light combining unit 120 is substantially a region located below a first outer frame 121 where no optical element is disposed, and the second transmission region TR2 of the second light combining unit 130 is substantially a region located above a second outer frame 132 where no optical element is disposed. The first transmission region TR1 and the second transmission region TR2 are shown by the dashed lines in FIG. 2A, which are configured to compare the positions of the first transmission region TR1 and the second transmission region TR2 in the drawing, and not to indicate that optical elements are disposed here.

Moreover, as shown in FIG. 3D, in the embodiment, the first light combining unit 120 may optionally include the first outer frame 121 and the first outer frame 121 surrounds the first reflection region RR1, and the second light combining unit 130 may also be optionally include the second outer frame 132 and the second outer frame 132 surrounds the second reflection region RR2. Specifically, in the embodiment, the functions of the first outer frame 121 and the second outer frame 132 are mainly to facilitate the adjustment of the angle and position of the first light combining unit 120 and the second light combining unit 130 with respect to each laser source unit LU. Specifically, in the embodiment, the first light combining unit 120 and the second light combining unit 130 may be simultaneously adjusted from above and below or may be adjusted from behind by connecting an actuator to the first outer frame 121 and the second outer frame 132. For example, the included angles between the first light combining unit 120 and the fourth laser source unit 114, and the second light combining unit 130 and the third laser source unit 113 are preferably 45 degrees, respectively, so as to achieve a good light receiving efficiency.

Under the above configuration, as shown in FIG. 2A to FIG. 2C, the first transmission region TR1 is located on a transmission path of the first laser beam 50L1, the second transmission region TR2 is located on a transmission path of the second laser beam 50L2, and the first laser beam 50L1 and the second laser beam 50L2 respectively pass through the first transmission region TR1 and the second transmission region TR2 to be incident on the focusing lens 140 along the first direction D1. On the other hand, the first reflection region RR1 is located on a transmission path of the fourth laser beam 50L4, the fourth laser beam 50L4 is transmitted to the focusing lens 140 via the first reflection region RR1, the second reflection region RR2 is located on a transmission path of the third laser beam 50L3, and the third laser beam 50L3 is transmitted to the focusing lens 140 via the second reflection region RR2.

Further, as shown in FIG. 2A to FIG. 2C, the focusing lens 140 is located on the transmission paths of the first laser beam 50L1, the second laser beam 50L2, the third laser beam 50L3, and the fourth laser beam 50L4. The first laser beam 50L1, the second laser beam 50L2, the third laser beam 50L3, and the fourth laser beam 50L4 are respectively incident on a first region, a second region, a third region, and a fourth region of a light incident surface of the focusing lens 140, and the projection positions of the first region, the second region, the third region, and the fourth region on a rectangular coordinate plane with the center of the focusing lens 140 as the origin O are correspondingly located in each of a first quadrant, a second quadrant, a third quadrant, and a fourth quadrant of the rectangular coordinate plane, respectively. For example, in the embodiment, the first region, the second region, the third region, and the fourth region are respectively the third quadrant, the first quadrant, the fourth quadrant, and the second quadrant of the rectangular coordinate plane. In this way, the first laser beam 50L1, the second laser beam 50L2, the third laser beam 50L3, and the fourth laser beam 50L4 may be uniformly incident on each region of the light incident surface of the focusing lens 140, thereby improving the light receiving efficiency. However, the disclosure is not limited thereto. In other embodiments, persons skilled in the art may adjust the regions of the light incident surface of the focusing lens 140 where the first laser beam 50L1, the second laser beam 50L2, the third laser beam 50L3, and the fourth laser beam 50L4 are incident on according to actual requirements, such that the same correspond to other positions of the rectangular coordinate plane. In this way, after passing through the focusing lens 140, the first laser beam 50L1, the second laser beam 50L2, the third laser beam 50L3, and the fourth laser beam 50L4 may form a laser beam 50 to be incident on a subsequent optical module.

For example, as shown in FIG. 1, in the embodiment, the wavelength conversion module PM may be located on a transmission path of the laser beam 50 and is configured to receive the laser beam 50. In addition, the wavelength conversion module PM includes a wavelength conversion region (not shown) and a non-conversion region (not shown). The wavelength conversion module PM also includes a first driving device (not shown), suitable for enabling the wavelength conversion region (not shown) and the non-conversion region (not shown) to correspondingly enter the irradiation range of the laser beam 50 at different times. Specifically, when the laser beam 50 is incident on the wavelength conversion region of the wavelength conversion module PM, a wavelength converted beam 60Y of the illumination system LS may be formed via the wavelength conversion region. In the embodiment, the wavelength converted beam 60Y is, for example, yellow light. When the laser beam 50 is incident on the non-conversion region of the wavelength conversion module PM, the laser beam 50 may be transmitted to the subsequent optical module by the wavelength conversion module PM.

As shown in FIG. 1, the filter module FM is located on transmission paths of the excitation beam 50 and the wavelength converted beam 60Y, and the filter module FM has a filter region (not shown) and a light transmission region (not shown). The filter module FM also includes a second driving device (not shown), suitable for enabling the filter region (not shown) to correspondingly enter the irradiation range of the wavelength conversion beam 60Y at different times to be, for example, respectively filtered to form red-colored color light and green-colored color light. On the other hand, the light transmission region (not shown) also correspondingly enters the irradiation range of the excitation beam 50 transmitted to the filter module FM at different times, such that the excitation beam 50 is passed through to form blue-colored color light. In this way, the excitation beam 50 and the wavelength conversion beam 60Y may be sequentially converted into the illumination beam 70 having multiple different colors.

In addition, as shown in FIG. 1, in the embodiment, the illumination system LS may optionally include an auxiliary light source AL. The auxiliary light source AL is configured to emit an auxiliary beam 60R. The waveband of the auxiliary beam 60R and the waveband of the wavelength conversion beam 60Y at least partially overlap. For example, in the embodiment, the auxiliary light source AL is, for example, a red laser source or a red-light-emitting diode light source, and the auxiliary beam 60R is red light. Moreover, as shown in FIG. 1, the filter module FM is also located on the transmission path of the auxiliary beam 60R. In addition, the light transmission region (not shown) also correspondingly enters the irradiation range of the auxiliary beam 60R transmitted to the filter module FM at different times, such that the auxiliary beam 60R is passed through to form a red-colored color light. In this way, the illumination system LS may increase the red light ratio in the illumination beam 70 by the configuration of the auxiliary light source AL, so as to improve the red color performance of the projected picture.

On the other hand, as shown in FIG. 1, in the embodiment, the projection device 200 further includes a light homogenizing element LH, located on the transmission paths of the excitation beam 50 and the wavelength conversion beam 60Y. In the embodiment, the light homogenizing element LH includes an integration rod, but the disclosure is not limited thereto. In more detail, as shown in FIG. 1, when the beam is transmitted to the light homogenizing element LH via the illumination system LS, the light homogenizing element LH may homogenize the excitation beam 50 and the wavelength conversion beam 60Y, and transmit the illumination beam 70 to the light valve 210.

Next, as shown in FIG. 1, the light valve 210 is located on the transmission path of the illumination beam 70 and is suitable for converting the illumination beam 70 into the image beam 80. The projection lens 220 is located on the transmission path of the image beam 80 and is suitable for projecting the image beam 80 onto a screen or wall (not shown) to form an image picture. After the illumination beam 70 converges on the light valve 210, the light valve 210 sequentially converts the illumination beam 70 into the image beam 80 to be transmitted to the projection lens 220. Therefore, the image beam 80 converted by the light valve 210 is projected out of the projection device 200 to form the image picture.

As such, in the embodiment, by configuring the first laser source unit 111 and the second laser source unit 112 with a displaced arrangement, the projection device 200 and the light source module 100 enable the first laser source unit 111 and the second laser source unit 112 to be disposed on the same plane and to have the heat dissipation module TM1 and the heat dissipation module TM2 independent from each other and the heat pipes HP thereof, so as to realize miniaturization of the projection device 200 and the illumination system LS and to have a simple light path design while taking into account the efficacy of heat dissipation. In addition, by disposing the first light combining unit 120 and the second light combining unit 130, the projection device 200 and the light source module 100 enable the first laser beam 50L1, the second laser beam 50L2, the third laser beam 50L3, and the fourth laser beam 50L4 to be uniformly incident on each region of the light incident surface of the focusing lens 140, so as to improve the light receiving efficiency, such that the illumination beam 70 has a good color performance.

It is worth noting that in the embodiment of FIG. 3D, although the first light combining unit 120 and the second light combining unit 130 are exemplified by the first outer frame 121 surrounding the first reflection region RR1 and the second outer frame 132 surrounding the second reflection region RR2, the disclosure is not limited thereto. In other embodiments, the first outer frame 121 may also surround the first reflection region RR1 and the first transmission region TR1, and the second outer frame 132 may also surround the second reflection region RR2 and the first transmission region TR1. Persons skilled in the art may make appropriate modifications to the structure of a projection device after referring to the disclosure to achieve effects and advantages similar to the projection device 200, but the projection device still fall within the scope of the disclosure. Some other embodiments are described below as illustrations.

Figures 4A, 4B:
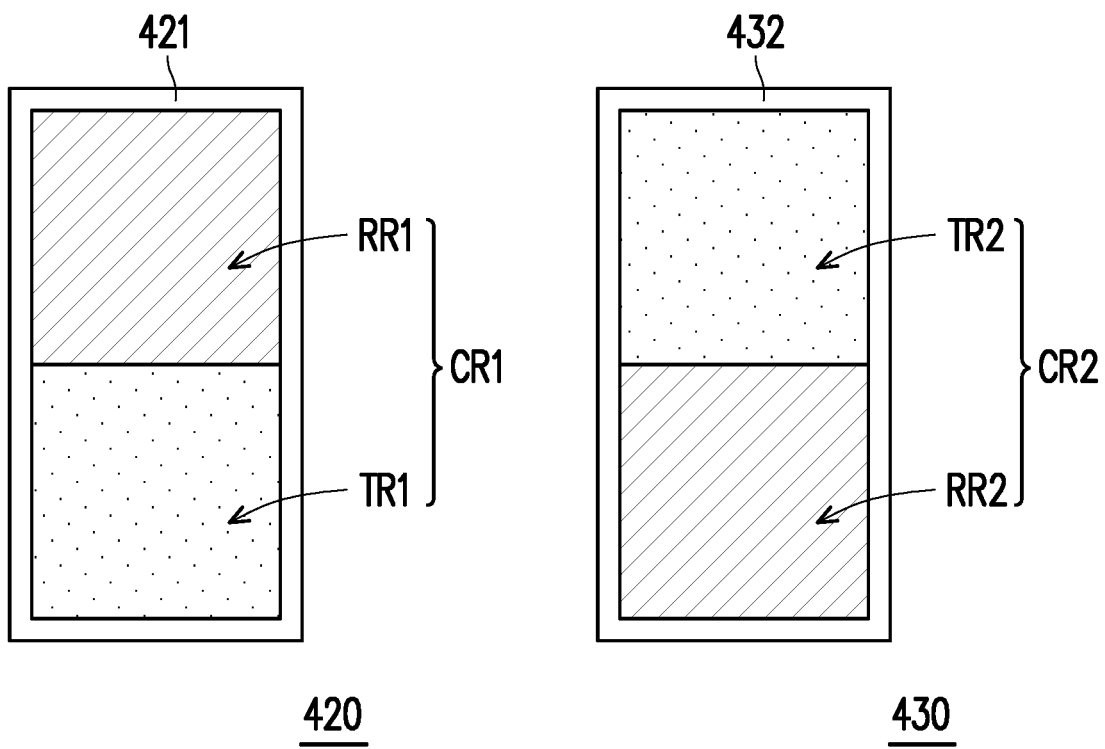
FIG. 4A to FIG. 4B are schematic view of structures of a first light combining unit and a second light combining unit according to another embodiment of the disclosure.
Figure 5A:
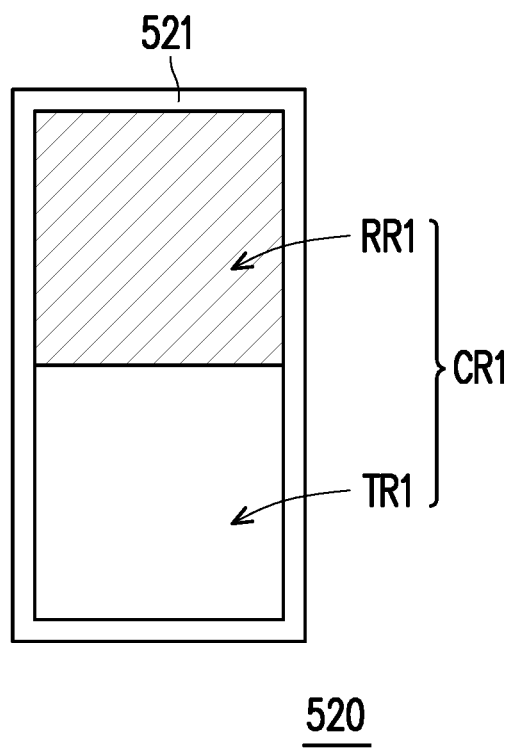
FIG. 5A to FIG. 5B are schematic views of structures of a first light combining unit and a second light combining unit according to yet another embodiment of the disclosure.
Figure 5B:
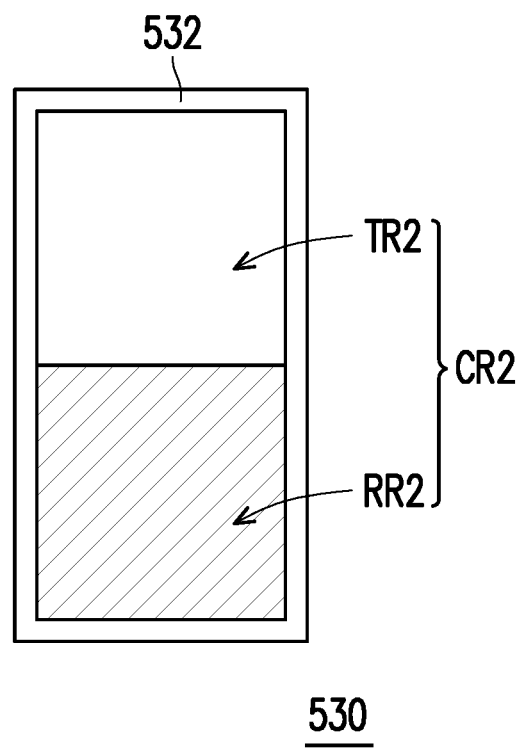

FIG. 4A to FIG. 4B are schematic view of structures of a first light combining unit and a second light combining unit according to another embodiment of the disclosure. FIG. 5A to FIG. 5B are schematic views of structures of a first light combining unit and a second light combining unit according to yet another embodiment of the disclosure. In the embodiment, as shown in FIG. 4A and FIG. 5A, first light combining units 420 and 520 are similar to the first light combining unit 120, and as shown in FIG. 4B and FIG. 5B, second light combining units 430 and 530 are similar to the second light combining unit 130, and the differences are described below. As shown in FIG. 4A and FIG. 5A, the first light combining units 420 and 520 further include first outer frames 421 and 521, and the first outer frames 421 and 521 surround a first light combining region CR1 formed by combining a first transmission region TR1 and a first reflection region RR1. Moreover, as shown in FIG. 4B and FIG. 5B, second outer frames 432 and 532 surround a second light combining region CR2 formed by combining a second transmission region TR2 and a second reflection region RR2.

On the other hand, as shown in FIG. 4A and FIG. 4B, the first transmission region TR1 of the first light combining unit 420 and the second transmission region TR2 of the second light combining unit 430 are comprised of a light-transmitting substrate to be respectively connected to the first outer frame 421 and the second outer frame 432. Alternatively, as shown in FIG. 5A and FIG. 5B, the first transmission region TR1 of the first light combining unit 520 and the second transmission region TR2 of the second light combining unit 530 may not have any optical element, that is, the first outer frame 521 and the second outer frame 532 may form a hollow structure to respectively form the first transmission region TR1 of the first light combining unit 520 and the second transmission region TR2 of the second light combining unit 530.

In this way, when the first light combining units 420 and 520 and the second light combining units 430 and 530 are applied to the light source module 100 and the projection device 200, the first light combining units 420 and 520 and the second light combining units 430 and 530 may also achieve the function of adjusting the angle and position of the first light combining units 420 and 520 and the second light combining units 430 and 530 relative to each laser source unit LU by the configuration of the first outer frames 421 and 521 and the second outer frames 432 and 532, so as to achieve effects and advantages similar to the first light combining unit 120 and the second light combining unit 130, which will not be reiterated here. In addition, when the first light combining units 420 and 520 and the second light combining units 430 and 530 are applied to the light source module 100 and the projection device 200, the light source module 100 and the projection device 200 may also achieve similar effects and advantages, which will not be reiterated here.

On the other hand, in the foregoing embodiment, although the projection device 200 is exemplified by having the wavelength conversion module PM and the filter module FM, the disclosure is not limited thereto. In other embodiments, when the light source module 100 of the embodiment simultaneously includes a red laser diode, a green laser diode, and a blue laser diode, the projection device 200 may omit the wavelength conversion module PM and the filter module FM, and use the laser beam 50 formed by the light source module 100 combining the first laser beam 50L1, the second laser beam 50L2, the third laser beam 50L3, and the fourth laser beam 50L4 as the illumination beam 70, and enable the illumination beam 70 to be transmitted the subsequent optical element. Persons skilled in the art may make appropriate modifications to the structure of a projection device after referring to the disclosure to achieve effects and advantages similar to the projection device 200, but the projection device still fall within the scope of the disclosure.

In summary, the embodiments of the disclosure have at least one of the following advantages or effects. In the embodiments of the disclosure, by configuring the first laser source unit and the second laser source unit with a displaced arrangement, the projection device and the light source module enable the first laser source unit and the second laser source unit to be disposed on the same plane and to have the heat dissipation modules independent from each other and the heat pipes thereof, so as to realize miniaturization of the projection device and the light source module and to have a simple light path design while taking into account the efficacy of heat dissipation. In addition, by disposing the first light combining unit and the second light combining unit, the projection device and the light source module enable the first laser beam, the second laser beam, the third laser beam, and the fourth laser beam to be uniformly incident on each region of the light incident surface of the focusing lens, so as to improve the light receiving efficiency, such that the illumination beam can have a good color performance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, configured to provide a laser beam, the light source module comprising:
a plurality of laser source units, wherein the laser source units comprise a first laser source unit, a second laser source unit, a third laser source unit and a fourth laser source unit, which are respectively configured to provide a first laser beam, a second laser beam, a third laser beam and a fourth laser beam;

a first light combining unit, wherein the first light combining unit has a first reflection region and a first transmission region;

a second light combining unit, wherein the second light combining unit has a second reflection region and a second transmission region; and a focusing lens, located on transmission paths of the first laser beam, the second laser beam, the third laser beam and the fourth laser beam, wherein the first laser beam, the second laser beam, the third laser beam and the fourth laser beam are respectively incident on the focusing lens along a first direction, the first laser source unit and the second laser source unit are arranged along a second direction, when viewed along a third direction, the first laser source unit and the second laser source unit do not overlap, and when viewed along the second direction, the first laser source unit and the second laser source unit are displaced up and down, and the first laser source unit and the second laser source unit are partially overlapped, the third laser beam is reflected by the second reflection region of the second light combining unit, and the fourth laser beam is reflected by the first reflection region of the first light combining unit, and the first direction, the second direction, and the third direction are perpendicular to one another.

2. The light source module according to claim 1, wherein a range of a shortest distance between the first laser source unit and the second laser source unit in the second direction is less than or equal to 2 mm.

3. The light source module according to claim 1, wherein the first laser source unit comprises a first side region, the second laser source unit comprises a second side region, and when viewed along the second direction, the first side region overlaps with the second side region.

4. The light source module according to claim 3, wherein the first laser source unit comprises a first fixing portion, the first fixing portion is located in the first side region, the second laser source unit comprises a second fixing portion, and the second fixing portion is located in the second side region.

5. The light source module according to claim 4, wherein when viewed along the second direction, a range of a shortest distance between a center line of the first fixing portion and a center line of the second fixing portion in the third direction is less than or equal to 8 mm.

6. The light source module according to claim 3, wherein the first laser source unit and the second laser source unit are located on a same plane, the first direction is perpendicular to the plane, and the second direction and the third direction are parallel to the plane.

7. The light source module according to claim 1, wherein the third laser source unit faces one side of the second direction, the fourth laser source unit faces another side of the second direction.

8. The light source module according to claim 1, wherein the first light combining unit is disposed corresponding to the first laser source unit and the fourth laser source unit, and the second light combining unit is disposed corresponding to the second laser source unit and the third laser source unit.

9. The light source module according to claim 8, wherein the first transmission region is located on a transmission path of the first laser beam, the second transmission region is located on a transmission path of the second laser beam, and the first laser beam and the second laser beam respectively pass through the first transmission region and the second transmission region to be transmitted to the focusing lens.

10. The light source module according to claim 9, wherein the first light combining unit further comprises a first outer frame, the first outer frame surrounds a first light combining region formed by combining the first transmission region and the first reflection region, the second light combining unit further comprises a second outer frame, and the second outer frame surrounds a second light combining region formed by combining the second transmission region and the second reflection region.

11. The light source module according to claim 9, wherein the first laser beam, the second laser beam, the third laser beam, and the fourth laser beam are respectively incident on a first region, a second region, a third region, and a fourth region of a light incident surface of the focusing lens, and projection positions of the first region, the second region, the third region, and the fourth region on a rectangular coordinate plane with a center of the focusing lens as an origin are correspondingly located in a third quadrant, a first quadrant, a fourth quadrant, and a second quadrant of the rectangular coordinate plane, respectively.

12. A projection device, comprising an illumination system, suitable for providing an illumination beam, the projection device further comprising:

a light source module, configured to provide a laser beam to form the illumination beam, comprising:

a plurality of laser source units, wherein the laser source units comprise a first laser source unit, a second laser source unit, a third laser source unit and a fourth laser source unit, which are respectively configured to provide a first laser beam, a second laser beam, a third laser beam and a fourth laser beam;

a first light combining unit, wherein the first light combining unit has a first reflection region and a first transmission region;

a second light combining unit, wherein the second light combining unit has a second reflection region and a second transmission region; and a focusing lens, located on transmission paths of the first laser beam, the second laser beam, the third laser beam and the fourth laser beam, wherein the first laser beam, the second laser beam, the third laser beam and the fourth laser beam are respectively incident on the focusing lens along a first direction, the first laser source unit and the second laser source unit are arranged along a second direction, when viewed along a third direction, the first laser source unit and the second laser source unit do not overlap, when viewed along the second direction, the first laser source unit and the second laser source unit are displaced up and down, and the first laser source unit and the second laser source unit are partially overlapped, and the first direction, the second direction, and the third direction are perpendicular to one another;

a light valve, disposed on a transmission path of the illumination beam and configured to convert the illumination beam into an image beam; and a projection lens, disposed on a transmission path of the image beam and configured to project the image beam out of the projection device.

13. The projection device according to claim 12, wherein a range of a shortest distance between the first laser source unit and the second laser source unit in the second direction is less than or equal to 2 mm.

14. The projection device according to claim 12, wherein the first laser source unit comprises a first side region, the second laser source unit comprises a second side region, and when viewed along the second direction, the first side region overlaps with the second side region.

15. The projection device according to claim 14, wherein the first laser source unit comprises a first fixing portion, the first fixing portion is located in the first side region, the second laser source unit comprises a second fixing portion, and the second fixing portion is located in the second side region.

16. The projection device according to claim 15, wherein when viewed along the second direction, a range of a shortest distance between a center line of the first fixing portion and a center line of the second fixing portion in the third direction is less than or equal to 8 mm.

17. The projection device according to claim 14, wherein the first laser source unit and the second laser source unit are located on a same plane, the first direction is perpendicular to the plane, and the second direction and the third direction are parallel to the plane.

18. The projection device according to claim 12, wherein the third laser source unit faces one side of the second direction, the fourth laser source unit faces another side of the second direction.

19. The projection device according to claim 18, wherein the first light combining unit is disposed corresponding to the first laser source unit and the fourth laser source unit, and the second light combining unit is disposed corresponding to the second laser source unit and the third laser source unit.

20. The projection device according to claim 19, wherein the first transmission region is located on a transmission path of the first laser beam, the second transmission region is located on a transmission path of the second laser beam, and the first laser beam and the second laser beam respectively pass through the first transmission region and the second transmission region to be transmitted to the focusing lens.

21. The projection device according to claim 20, wherein the first light combining unit further comprises a first outer frame, the first outer frame surrounds a first light combining region formed by combining the first transmission region and the first reflection region, the second light combining unit further comprises a second outer frame, and the second outer frame surrounds a second light combining region formed by combining the second transmission region and the second reflection region.

22. The projection device according to claim 18, wherein the first laser beam, the second laser beam, the third laser beam, and the fourth laser beam are respectively incident on a first region, a second region, a third region, and a fourth region of a light incident surface of the focusing lens, and projection positions of the first region, the second region, the third region, and the fourth region on a rectangular coordinate plane with a center of the focusing lens as an origin are correspondingly located in a third quadrant, a first quadrant, a fourth quadrant, and a two quadrant of the rectangular coordinate plane, respectively.

* * * * *